United States Patent
Brown et al.

(10) Patent No.: US 8,172,014 B2
(45) Date of Patent: May 8, 2012

(54) WHEELED VEHICLE

(75) Inventors: Fredrick Charles Brown, St. Albans (GB); Graham Reginald Nicholls, Little Brickhill (GB)

(73) Assignee: Advanced Vehicle Concepts Limited (GB)

( * ) Notice: Subject to any disclaimer, the term of this patent is extended or adjusted under 35 U.S.C. 154(b) by 68 days.

(21) Appl. No.: 12/309,559

(22) PCT Filed: May 11, 2007

(86) PCT No.: PCT/GB2007/001758
§ 371 (c)(1),
(2), (4) Date: Apr. 30, 2009

(87) PCT Pub. No.: WO2008/012487
PCT Pub. Date: Jan. 31, 2008

(65) Prior Publication Data
US 2009/0314568 A1    Dec. 24, 2009

(30) Foreign Application Priority Data
Jul. 25, 2006   (GB) .................................. 0614709.4

(51) Int. Cl.
*B62D 61/12* (2006.01)
(52) U.S. Cl. ..................... 180/22; 180/209; 280/93.502; 280/93.51; 280/137.5
(58) Field of Classification Search ................... 180/22, 180/21, 209–211; 280/771, 87.2, 776, 89–89.12, 280/93.502–93.509, 93.51, 137.5, 137.502
See application file for complete search history.

(56) References Cited

U.S. PATENT DOCUMENTS

| | | | | |
|---|---|---|---|---|
| 2,788,858 A * | 4/1957 | Aasland et al. | ............... | 180/210 |
| 2,854,084 A * | 9/1958 | Isaac | .............................. | 180/209 |
| 2,863,518 A * | 12/1958 | Pellizzetti | ..................... | 180/414 |
| 3,236,323 A * | 2/1966 | Austin | .......................... | 180/209 |
| 3,587,767 A * | 6/1971 | Gamaunt | ....................... | 180/431 |
| 3,664,532 A * | 5/1972 | Gustafson | ..................... | 414/440 |
| 3,700,059 A * | 10/1972 | Sutton | .......................... | 180/209 |
| 3,937,486 A * | 2/1976 | Weiters | ......................... | 280/771 |
| 4,313,511 A * | 2/1982 | Soo Hoo | ........................ | 180/21 |
| 4,406,473 A * | 9/1983 | Sexton | ....................... | 280/89.11 |

(Continued)

FOREIGN PATENT DOCUMENTS
CN            1034513         8/1989
(Continued)

*Primary Examiner* — Eric Culbreth
*Assistant Examiner* — Nicole Verley
(74) *Attorney, Agent, or Firm* — Stetina Brunda Garred & Brucker (57) ABSTRACT

A vehicle steering means with a first front ground-engaging steerable wheel located in the front center of the vehicle; second and third front ground-engaging wheels located either side of the first front ground-engaging wheel with means for adjusting the steer angle and the height depending on the steer angle of the first front ground-engaging wheel. When the first front ground-engaging wheel has a straight-ahead steer angle, the second and third wheels are also straight-ahead and all three front ground-engaging wheels are in contact with the ground; and when the steer angle of the first front ground-engaging wheel is turned, the steer angle of the front ground-engaging wheel on the outside of said curve is turned at least partly towards the steer angle of the first front ground-engaging wheel, the steer angle of the front ground-engaging wheel on the inside of said curve is not substantially turned towards the steer angle of the first front ground-engaging wheel.

24 Claims, 10 Drawing Sheets

U.S. PATENT DOCUMENTS

| | | | | |
|---|---|---|---|---|
| 4,475,613 A | * | 10/1984 | Walker | 180/22 |
| 4,513,832 A | * | 4/1985 | Engman | 180/6.5 |
| 4,513,837 A | * | 4/1985 | Archer | 180/209 |
| 4,697,817 A | * | 10/1987 | Jefferson | 280/89.12 |
| 5,029,894 A | * | 7/1991 | Willman | 280/755 |
| 5,129,477 A | * | 7/1992 | Hurlburt | 180/265 |
| 5,181,740 A | * | 1/1993 | Horn | 280/755 |
| 5,312,124 A | * | 5/1994 | Linde et al. | 280/124.113 |
| 5,447,321 A | * | 9/1995 | Hurlburt et al. | 280/93.504 |
| 5,467,838 A | * | 11/1995 | Wu | 180/209 |
| 5,904,218 A | * | 5/1999 | Watkins | 180/209 |
| 6,086,075 A | * | 7/2000 | O'Bryan et al. | 280/89.12 |
| 6,752,230 B1 | * | 6/2004 | Huang | 180/209 |
| 6,834,734 B2 | * | 12/2004 | Wu | 180/65.51 |
| 2006/0108159 A1 | * | 5/2006 | Jansson et al. | 180/21 |

FOREIGN PATENT DOCUMENTS

| | | |
|---|---|---|
| WO | WO 91/03222 | 3/1991 |
| WO | WO 03/020194 A1 | 3/2003 |

* cited by examiner

WHEELED VEHICLE

This invention relates to wheeled vehicles. The invention is particularly applicable, but by no means limited, for use as a mobility scooter (e.g. as used by the elderly, disabled or infirm).

BACKGROUND TO THE INVENTION

Traditional mobility scooters, as typically used by the elderly, disabled or infirm, are manufactured in two formats: three-wheeled versions, and four-wheeled versions.

Figure 1A:
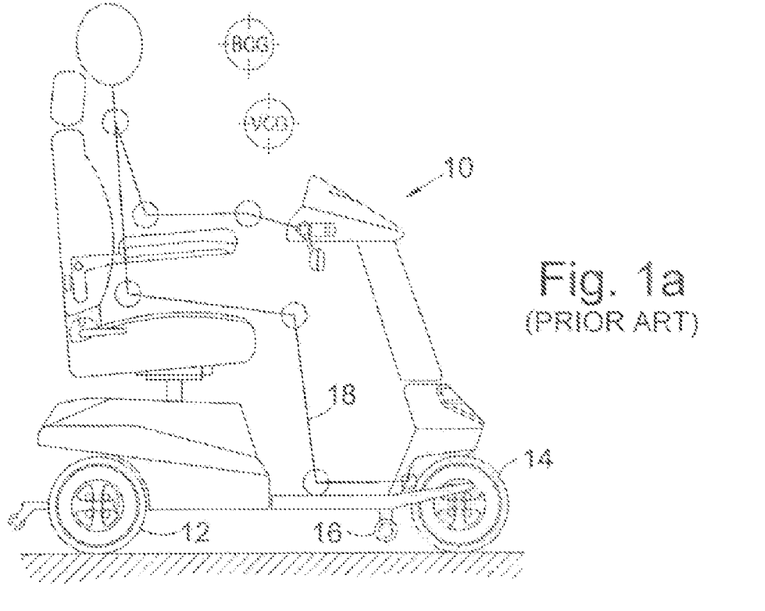
FIGS. 1a and 1b illustrate a conventional three-wheeled mobility scooter, shown from the side and the front respectively.
Figure 1B:
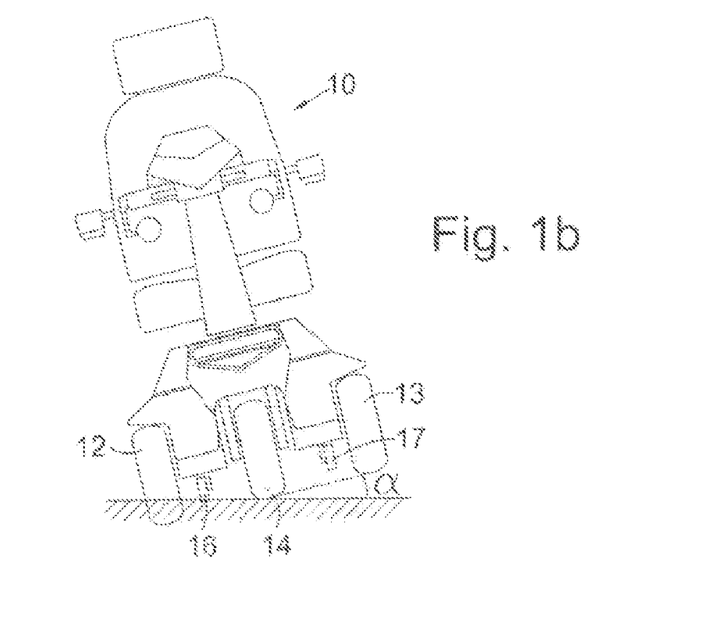

As illustrated in FIGS. 1a and 1b, known three-wheeled scooters 10 have two wheels 12, 13 at the rear of the vehicle, and one wheel 14 at the front. The rear wheels 12, 13 normally serve as the driven wheels, although some smaller models provide drive from the front wheel 14. The steering for the vehicle is provided by the front wheel 14, which is steerable.

Three-wheeled scooters have some advantages, and some disadvantages. Advantageously, having only one wheel at the front allows the user 18 to place their feet on the floor either side of the wheel 14, thus giving an ideal seating position (see FIG. 1a). The three-wheeled configuration also allows maximum maneuverability when used in a confined area.

However, three-wheeled scooters have the disadvantages that, if the vehicle should hit an obstacle such as a kerb, pot hole or steep camber (angle $\alpha$), the rear wheel can lift, tipping the vehicle over. This situation can also arise when braking and turning at the same time. In short, three-wheeled scooters are inherently unstable. To compensate for this instability, small caster wheels 16, 17 may be fitted either side of the floor pan. The problem with such caster wheels is that they decrease ground clearance, and in some situations momentarily cause loss of steering by lifting the front wheel 14 off the ground. The normal mounting position of the caster wheels 16, 17 is approximately 150 mm back from the front wheel 14. This is not an ideal position, it is a compromise, and in many situations will not stop the vehicle from tipping over.

Figure 2A:
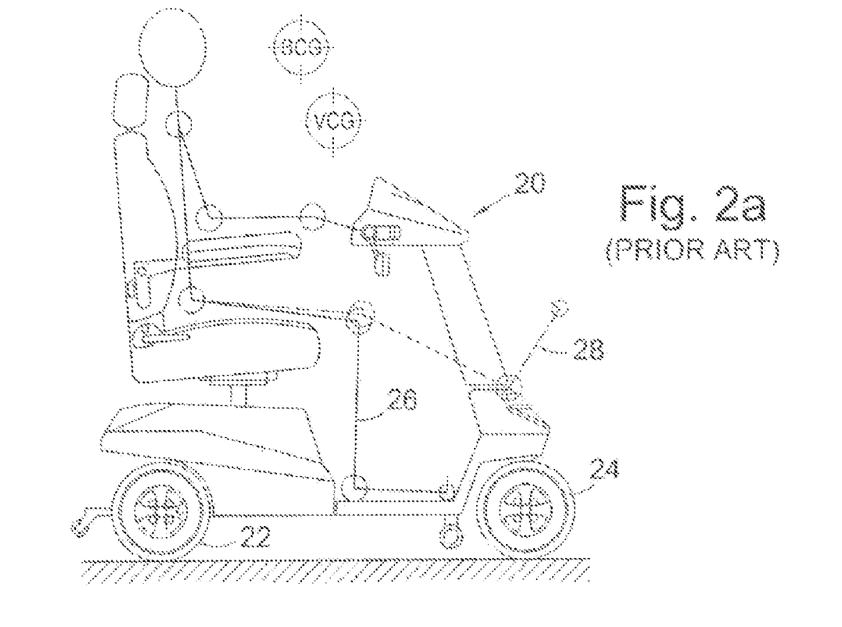
FIGS. 2a and 2b illustrate a conventional four-wheeled mobility scooter, shown from the side and the front respectively.
Figure 2B:
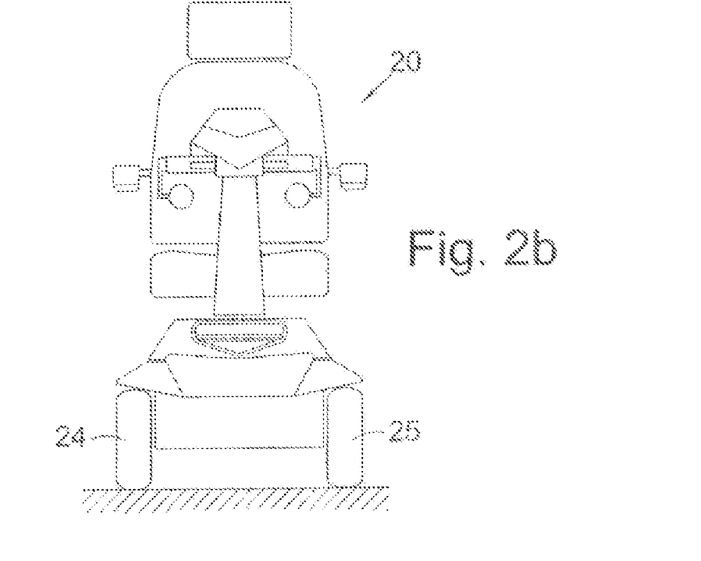

As illustrated in FIGS. 2a and 2b, known four-wheeled scooters 20 have two wheels 22 at the rear, and two steerable wheels 24, 25 at the front. Generally the two rear wheels are driven. The two front steerable wheels 24, 25 are linked by the steering mechanism, such that they steer in unison.

Four-wheeled scooters also have some advantages, and some disadvantages. The primary advantage is that, by having a wheel in each corner of the vehicle, it is inherently very stable.

However, disadvantageously, because both front wheels 24, 25 have to turn when steering, the floor pan area is restricted (see FIG. 2a). To minimize the area of the floor pan required by the front wheels for steering, the steering lock is reduced from that of a three-wheeled scooter, and consequently maneuverability of the four-wheeled scooter is restricted.

An additional problem is the knee position and knee angle of the user 26 on a four-wheeled scooter (see FIG. 2a). Because of the restricted floor pan area of a four-wheeled scooter, the user's knee is articulated such that the lower leg is in a substantially vertical position, which places pressure on the hip joint (as illustrated by the solid line 26 in FIG. 2a). This also has the effect of the person positioning themselves in a "sit up and beg" position, which is considered a bad posture, especially for a disabled person with arthritic joints. To compensate for this problem with the seated position, some manufacturers of four-wheeled scooters encourage the user to place their feet on the cover above the front wheels (as illustrated by the dotted line 28 in FIG. 2a) to elevate the knee joint angle, but this has been found to aggravate the hip joint angle and to place pressure on the user's back.

A further problem is that four-wheeled scooters do not have a "null zone" in which the steering centres itself. With a car, if the steering wheel is released during cornering, it will centralise itself. However, four-wheeled scooters do not have this feature, and consequently the steering is very active and can cause "grabbing" of the front wheels, whereby the steer angle of the front wheels is varied in an uncontrolled manner. This can be unnerving if the rider has low upper body strength, and in the extreme can be dangerous.

Thus, from the above discussion, it will be appreciated that a mobility vehicle should ideally have the following characteristics:
1. a tight turning circle (conventionally provided by three-wheeled scooters, but not by four-wheeled scooters)
2. stability (conventionally provided by four-wheeled scooters, but not by three-wheeled scooters)
3. good seating posture for the user (conventionally provided by three-wheeled scooters, but not by four-wheeled scooters)
4. active (self centralising) steering
5. compact dimensions

SUMMARY OF THE INVENTION

According to a first aspect of the present invention there is provided a vehicle comprising: steering means for operation by a user; one or more rear ground-engaging wheels; a first front ground-engaging wheel located substantially in the centre at substantially the front of the vehicle and being steerable in response to operation of the steering means; second and third front ground-engaging wheels located either side of the first front ground-engaging wheel; and adjustment means for adjusting the steer angle and the height of the second and third front ground-engaging wheels depending on the steer angle of the first front ground-engaging wheel, the adjustment means being configured such that: when the first front ground-engaging wheel has a straight-ahead steer angle, the steer angles of the second and third front ground-engaging wheels are also straight-ahead and all three front ground-engaging wheels are in contact with the ground; and when the steer angle of the first front ground-engaging wheel is turned such that motion of the vehicle would describe a curve, the steer angle of the front ground-engaging wheel on the outside of said curve is turned at least partly towards the steer angle of the first front ground-engaging wheel, the steer angle of the front ground-engaging wheel on the inside of said curve is not substantially turned towards the steer angle of the first front ground-engaging wheel, and the height of the front ground-engaging wheel on the inside of said curve is raised relative to the height of the front ground-engaging wheel on the outside of said curve, the first front ground-engaging wheel and the front ground-engaging wheel on the outside of said curve remaining in contact with the ground.

By virtue of the steer angle of the front ground-engaging wheel on the outside of said curve turning at least partly towards the steer angle of the first front ground-engaging wheel, this provides good stability of the vehicle during turning, since two front ground-engaging wheels remain in contact with the ground.

Also, by virtue of the of the steer angle of the front ground-engaging wheel on the inside of said curve not substantially turning towards the steer angle of the first front ground-engaging wheel, this provides the advantage that the wheel on the inside of said curve does not encroach into the vehicle's floor pan area. Raising the height of the front ground-engaging wheel on the inside of said curve advantageously prevents this wheel from scraping or scrubbing against the ground during turning of the vehicle. As a consequence of these features, the floor pan may have a more spacious configuration, as provision does not need to be made for the second and third front ground-engaging wheels to encroach into the floor pan when one or the other is on the inside of the said curve. Since such encroachment does not need to be provided for, there is no requirement to reduce the steering lock of the vehicle, and consequently the vehicle can be made highly maneuverable with a tight turning circle, yet with a compact overall design.

In the example of a mobility scooter in accordance with the present invention, this increases the floor pan area in which the user may place their feet, compared to conventional four-wheeled scooters, allowing the user to place their feet either side of the first front ground-engaging wheel. The user may therefore sit in a comfortable posture, similar to that obtained using a three-wheeled scooter. Since, during turning, there are two front ground-engaging wheels in contact with the ground, this provides stability at least as good as that of a four-wheeled scooter. Further benefits are that the scooter is highly maneuverable, with a tight turning circle comparable to that of a conventional three-wheeled scooter, and with a compact overall design.

Preferably the adjustment means comprise a pivotally-mounted subassembly on which the second and third front ground-engaging wheels are mounted. Such a pivotally-mounted subassembly advantageously provides a means for raising the second or third front ground-engaging wheel from the ground when it is on the inside of the curve during turning.

Preferably the vehicle further comprises a structural member movable by operation of the steering means and arranged to act on the subassembly and to cause the subassembly to pivot as a consequence of operation of the steering means. This advantageously provides a reliable mechanical mechanism which causes the subassembly to pivot as a consequence of operation of the steering means, without the need for a power source to cause the pivoting.

Preferably a first end of the said structural member is arranged in movable contact against the subassembly, such that movement of the first end of the structural member across the subassembly, as a consequence of operation of the steering means, causes the subassembly to pivot.

Preferably the subassembly is mounted about a pivot axis, the pivot axis being inclined at an angle above the horizontal, relative to an imaginary horizontal plane defined by the lowermost points of the ground-engaging wheels. Angling the subassembly in this manner advantageously gives rise to a camming action between the first end of the structural member and the subassembly, causing the subassembly to pivot as the structural member moves across. Particularly preferably the angle of the pivot axis above the horizontal is approximately 5°.

Particularly preferably the subassembly incorporates a profiled region. The profiled region also advantageously gives rise to a camming action between the first end of the structural member and the subassembly, causing the subassembly to pivot.

Preferably the profiled region is substantially concave, U-shaped or V-shaped. Such a profile advantageously enables the subassembly to tilt one way or the other, depending on the said structural member acting against one side or the other side of the profiled region.

Preferably the first end of the said structural member is arranged to locate within the profiled region when the steering means are configured for straight-ahead travel. This highly advantageously provides a self-centering mechanism for the steering, causing the steering to be automatically centralised in the straight-ahead (or "null") position if the user loses control of the steering means.

Preferably the first end of the said structural member is provided with rolling means. The rolling means may be, for example, one or more wheels, or alternatively may be one or more rollers, or one or more bearings: Alternatively, the first end of the said structural member may be provided with sliding means, for sliding across the subassembly; or toothed means for engaging across the subassembly (e.g. in the manner of a rack-and-pinion assembly).

Preferably the first front ground-engaging wheel is provided with a steering shaft, and the second end of the said structural member is attached to the said steering shaft. This provides the advantage of direct mechanical action between the steering shaft and the subassembly, as a consequence of rotating the steering shaft.

Preferably the said structural member extends from the said steering shaft to the said subassembly, substantially parallel to the circumference of the first front ground-engaging wheel. This provides a compact configuration for the mechanical action between the steering shaft and the subassembly.

Preferably the subassembly incorporates a curved region shaped to correspond with the locus defined by the second end of the said structural member during variation of the steer angle of the first front ground-engaging wheel, the second end of the said structural member acting on the said curved region of the subassembly. Providing a curved region in this manner provides the benefit that the quantity and weight of material used in the subassembly may be minimised.

Preferably the adjustment means further comprise first and second connecting rods, the first and second connecting rods each having a first end and a second end, the first end of each connecting rod being arranged to move in response to operation of the steering means, the second end of the first connecting rod being coupled to a hub or steering arm of the second front ground-engaging wheel, the second end of the second connecting rod being coupled to a hub or steering arm of the third front ground-engaging wheel, and each of the first and second connecting rods being operable to push but not substantially pull its respective hub or steering arm in response to operation of the steering means.

This arrangement of first and second connecting rods advantageously provides means such that, when the steer angle of the first front ground-engaging wheel is turned such that motion of the vehicle would describe a curve, the steer angle of the front ground-engaging wheel on the outside of said curve is turned at least partly towards the steer angle of the first front ground-engaging wheel, and the steer angle of the front ground-engaging wheel on the inside of said curve is not substantially turned towards the steer angle of the first front ground-engaging wheel.

Particularly preferably the first and second connecting rods each incorporate a telescopic shaft, and each telescopic shaft is configured to lengthen in order not to substantially pull its respective hub or steering arm.

Preferably the vehicle further comprises biasing means acting on the hub or steering arm of each of the second and third front ground-engaging wheels, the biasing means arranged to bias the steer angle of the second and third front ground-engaging wheels into a straight-ahead position. Such biasing means advantageously serve to retain the second and third front-engaging wheels in straight-ahead alignment if they are not being steered outwards by the corresponding first or second connecting rod. Such biasing means also advantageously mitigate against unwanted varying of the steer angle of the second and third front-engaging wheels during reverse motion of vehicle. By way of example, the biasing means may comprise springs, or gas struts.

Preferably the second and third front ground-engaging wheels are provided with stop means arranged such that, when the steer angle of the first front ground-engaging wheel is turned such that motion of the vehicle would describe a curve, the steer angle of the front ground-engaging wheel on the inside of said curve is prevented from turning past a substantially straight-ahead steer angle towards the steer angle of the first front ground-engaging wheel. Such stop means advantageously prevent any potential encroachment of the second and third front ground-engaging wheels into the floor pan area of the vehicle, and also limit the extent to which the biasing means are able to move the second and third front ground-engaging wheels.

In alternative embodiments, the adjustment means may comprise one or more actuators. The said one or more actuators may comprise one or more of the following: electrical actuators, electromagnetic actuators, pneumatic actuators, hydraulic actuators, servo-pneumatic actuators, servo-hydraulic actuators. Other forms of actuators may be known to those skilled in the art, and the present disclosure is intended to apply to all appropriate existing forms of actuators, and also those which have yet to be invented or developed.

The said one or more actuators may be controlled by processing means, such as a microprocessor.

Preferably the first front ground-engaging wheel has a larger diameter than the second and third front ground-engaging wheels. By being larger, the first front ground-engaging wheel advantageously enables the vehicle to negotiate uneven terrain, kerbs, etc. By being smaller, the second and third front ground-engaging wheels do not take up unnecessary space at the front of the vehicle, and contribute towards the overall compactness of the vehicle.

Preferably the second and third front ground-engaging wheels are mounted such that they are vertically movable in response to uneven terrain.

According to a second aspect of the present invention there is provided a vehicle comprising one or more rear ground-engaging wheels and three front ground-engaging wheels, wherein all three front ground-engaging wheels are in contact with the ground during straight-ahead motion of the vehicle.

Preferably the vehicle further comprises means to lift one of the front ground-engaging wheels from the ground during turning of the vehicle.

With the first and second aspects of the invention, preferably the vehicle is a mobility scooter.

According to a third aspect of the present invention there is provided a steering assembly for a vehicle, the steering assembly comprising: steering means for operation by a user; a first ground-engaging wheel being steerable in response to operation of the steering means; second and third ground-engaging wheels located either side of the first ground-engaging wheel; and adjustment means for adjusting the steer angle and the height of the second and third ground-engaging wheels depending on the steer angle of the first ground-engaging wheel, the adjustment means being configured such that: when the first ground-engaging wheel has a straight-ahead steer angle, the steer angles of the second and third ground-engaging wheels are also straight-ahead and all three ground-engaging wheels are in contact with the ground; and when the steer angle of the first ground-engaging wheel is turned such that motion of the vehicle would describe a curve, the steer angle of the ground-engaging wheel on the outside of said curve is turned at least partly towards the steer angle of the first ground-engaging wheel, the steer angle of the ground-engaging wheel on the inside of said curve is not substantially turned towards the steer angle of the first ground-engaging wheel, and the height of the ground-engaging wheel on the inside of said curve is raised relative to the height of the ground-engaging wheel on the outside of said curve, the first ground-engaging wheel and the ground-engaging wheel on the outside of said curve remaining in contact with the ground.

According to a fourth aspect of the present invention there is provided a steering mechanism for a vehicle having a steerable ground-engaging wheel, comprising means for biasing the steer angle of the steerable ground-engaging wheel into a straight-ahead orientation.

Preferably the steering mechanism comprises a first member which incorporates a profiled region, and a second member, the second member being arranged to move in contact along the profiled region of the first member in response to steering of the steerable wheel; the profiled region is substantially concave, U-shaped or V-shaped; and the second member is arranged to locate within the profiled region when the steer angle of the steerable wheel is in a straight-ahead orientation.

According to a fifth aspect of the present invention there is provided a steering mechanism for a vehicle, the steering mechanism including a connecting rod having a first end and a second end; the first end of the connecting rod being arranged to move in response to operation of steering means, and the second end of the connecting rod being coupled to a hub or steering arm of a ground-engaging wheel, wherein the connecting rod is operable to push but not substantially pull the hub or steering arm in response to operation of the steering means.

Preferably the connecting rod incorporates a telescopic shaft, and the telescopic shaft is configured to lengthen in order not to substantially pull the hub or steering arm.

It will be appreciated that the preferable or optional features described above with respect to the first aspect of the invention are equally applicable as preferable or optional features in respect to the second, third, fourth or fifth aspects of the invention. Further, the features described herein may be used in any combination, as will be appreciated by those skilled in the art.

BRIEF DESCRIPTION OF THE DRAWINGS

Embodiments of the invention will now be described, by way of example only, and with reference to the drawings in which.

In the figures, like elements are indicated by like reference numerals throughout.

DETAILED DESCRIPTION OF PREFERRED EMBODIMENTS

The present embodiments represent the best ways known to the applicant of putting the invention into practice. However they are not the only ways in which this can be achieved.

The present embodiments depict mobility scooters (e.g. as used by the elderly, disabled or infirm). However, the principles described herein may readily be adapted for use in other wheeled vehicles in which high levels of both mobility and stability are required, such as wheelchairs, off-road buggies, mining vehicles, construction vehicles, farming vehicles, tractors and go-karts.

Figure 3A:
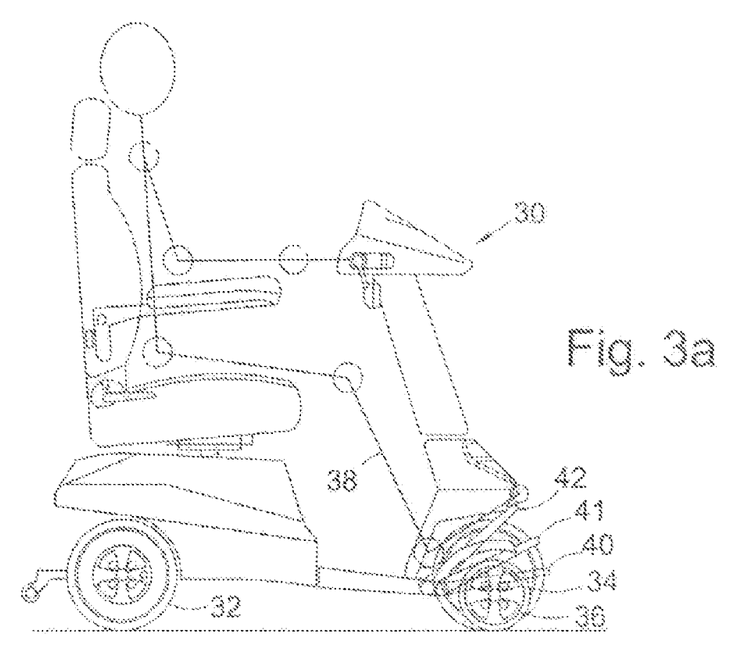
FIGS. 3a and 3b illustrate a five-wheeled mobility scooter according to an embodiment of the present invention, shown from the side and the front respectively
Figure 3B:
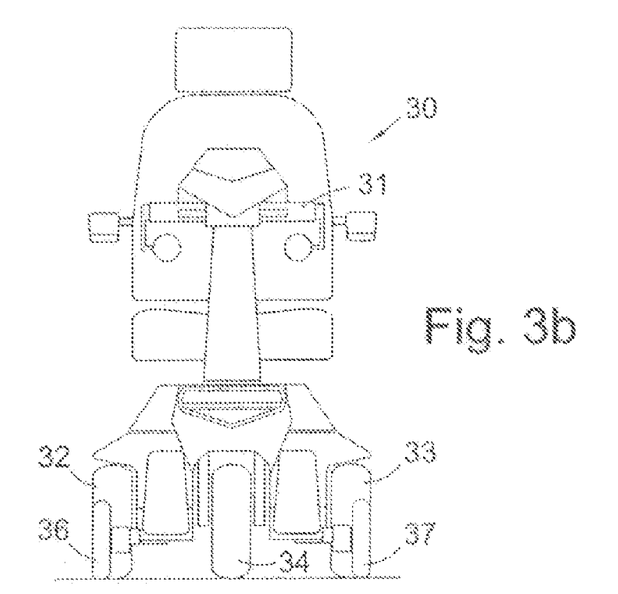

FIGS. 3a and 3b illustrate a presently preferred embodiment of a mobility scooter 30 in accordance with the present invention. The scooter 30 has five ground-engaging wheels, 32, 33, 34, 36, 37. The two rear wheels 32, 33 are driven—for example, by a battery powered motor situated beneath the seat of the scooter. At the front of the scooter 30 is a central steerable wheel 34, which is steered by operation of the handlebars 31 (or other steering means arranged to receive input from a user, such as a joystick, or one or more levers, buttons or paddle controls etc.)

Either side of the central wheel 34 at the front of the scooter is a so-called "outrigger" wheel 36, 37. The central front wheel 34 is substantially the same diameter as the two rear wheels 32, 33. The two outrigger wheels 36, 37 are of a smaller diameter than the central front wheel 34. During straight-ahead motion of the vehicle, all five wheels 32, 33, 34, 36 and 37 are in contact with the ground, which provides extremely stable motion, even when traversing uneven terrain or kerbs etc.

Figure 12:
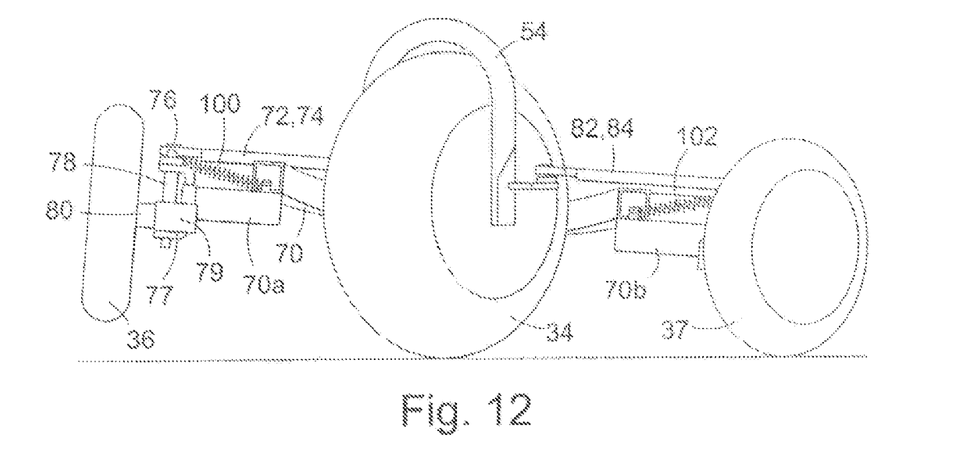
FIG. 12 illustrates a front view of the front three wheels during steering, showing the subassembly pivoted to one side and thereby causing one wheel (which remains in a straight-ahead steer angle) to be lifted off the ground.

As shown in FIG. 12, the outrigger wheels 36, 37 are configured such that, when the steer angle of the central front wheel 34 is turned such that the vehicle 30 would move along a curved path (the vehicle steering to its right, in the example of FIG. 12), the steer angle of the outrigger wheel 37 on the outside of that curved path is turned at least partly towards the steer angle of the central front wheel 34. This provides good stability of the vehicle 30 during turning. The outrigger wheel 36 on the inside of the curved path is not turned towards the steer angle of the central front wheel 34, though. This provides the advantage that the outrigger wheel 36 on the inside of the curved path does not encroach into the vehicle's floor pan area, and thus does not reduce the area available for the user's feet. Instead, the outrigger wheel 36 remains in a straight-ahead steer angle, and is lifted off the ground so that the wheel 36 does not scrape or scrub across the ground during steering of the vehicle.

Conversely, if the steer angle of the central front wheel 34 is such that the vehicle would turn to its left, then outrigger wheel 36 is on the outside of the curve, and so the steer angle of outrigger wheel 36 is turned at least partly towards the steer angle of the central front wheel 34. The outrigger wheel 37 on the inside of the kerb remains in a straight-ahead steer angle and is lifted off the ground.

Thus, the central front wheel 34 and one of the two outrigger wheels 36, 37 remain in contact with the ground during cornering, thereby providing stability to the vehicle and user.

Figure 13:
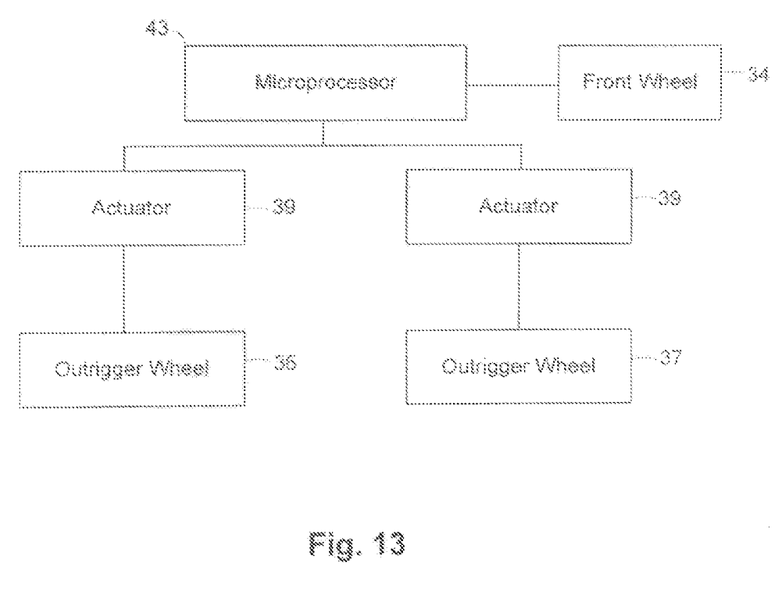
FIG. 13 is a schematic illustrating a processing means and an actuator.

The steering assembly is configured to alter the steer angle and height of the outrigger wheel 36, 37 depending on the steer angle of the central front wheel 34. In one embodiment, the steer angle and height of the outrigger wheels 36, 37 may be adjusted by one or more actuators 39 arranged to lift or turn the steer angle of the outrigger wheels 36, 37. These actuators 39 may be microprocessor 43 controlled, and may respond directly to the steer angle of the central front wheel 34, or to the steer angle of the handlebars 31, or to any other input provided by the user via appropriate steering means. The actuators 39 may be electrical, electromagnetic, pneumatic, hydraulic, servo-pneumatic, servo-hydraulic, or any other suitable form, as will be appreciated by those skilled in the art.

In the presently preferred embodiment, however, actuators 39 are not used to alter the steer angle and height of the outrigger wheels 36, 37. Instead, an entirely mechanical adjustment mechanism, as illustrated in FIGS. 5 to 12, is provided for altering the steer angle and height of the outrigger wheels 36, 37 depending on the steer angle of the central front wheel 34. This is presently preferred since, by being entirely mechanical, it is extremely reliable, is not susceptible to electrical faults or other power supply problems, and does not require an energy source in order to operate.

Figure 5:
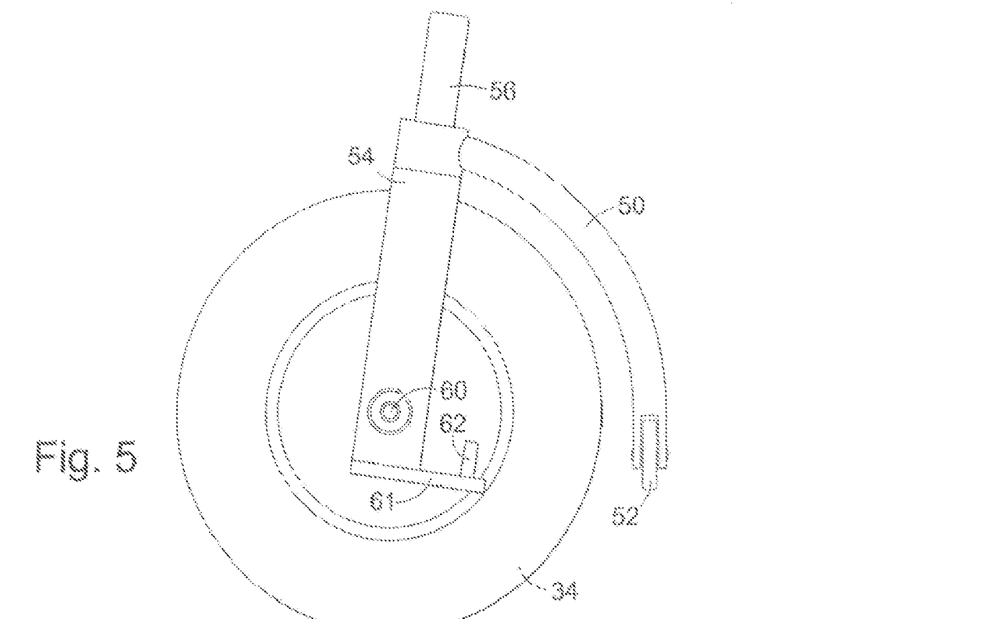
FIG. 5 illustrates a side view of the central front wheel of an embodiment of the present invention, removed from the rest of the vehicle.
Figure 8:
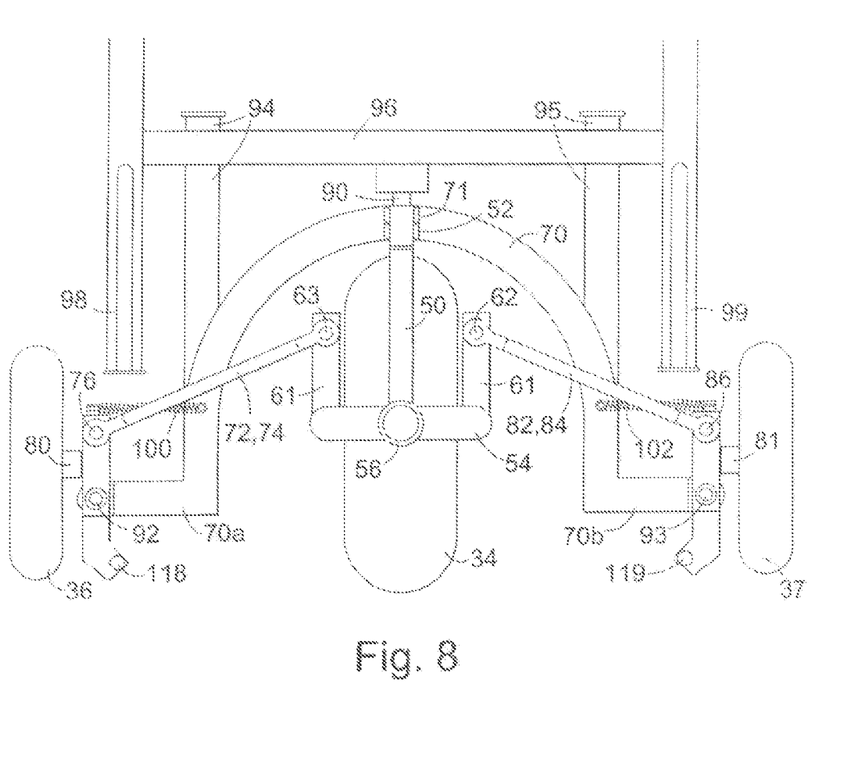
FIG. 8 illustrates a plan view from above of the front three wheels aligned in a straight-ahead steer angle, and the pivotally-mounted subassembly, incorporated in a mobility scooter.
Figure 9:
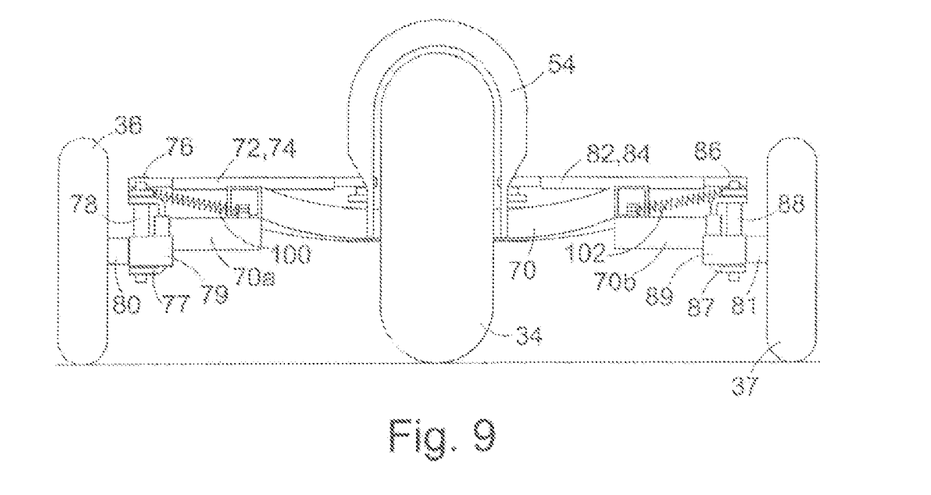
FIG. 9 illustrates a front view of the front three wheels aligned in a straight-ahead steer angle, and the pivotally-mounted subassembly, incorporated in a mobility scooter.

With reference initially to FIGS. 5 and 8, the present mechanical adjustment mechanism is constructed around two principal components, namely a pivotally-mounted subassembly 70, 70a, 70b, and a shaft 50. The two outrigger wheels 36, 37 are mounted on either side of the subassembly, with outrigger wheel 36 being attached via axle 80 to subframe region 70a, and outrigger wheel 37 being attached via axle 81 to subframe region 70b.

As shown in FIG. 8, the central part of the subassembly is formed as a semicircular or U-shaped frame 70. This is attached to the main chassis of the vehicle (e.g. to cross member 96, which in turn is supported by longitudinal members 98, 99) by a pivot axis 90. The pivot axis 90 is oriented at an angle 91 (see FIG. 6) of approximately 5 degrees above the horizontal. The subassembly frame 70 can pivot to the left or the right about the pivot axis 90, thereby enabling one or the other of the outrigger wheels 36, 37 to be lifted off the ground.

Articulation of the subassembly frame 70 in the vertical plane is restricted by stop members 94, 95, which can abut the underside of the cross member 96 to limit vertical motion. In use, the extent of the vertical movement when the subassembly frame 70 pivots is such as to lift the outrigger wheels of the order of 25 mm above the ground. The central front wheel 34 is located within the semicircular shape of the subassembly frame 70.

With reference initially to FIG. 5, the central front wheel 34 is mounted in a fork 54 by an axle 80. The fork 54 is attached to a steering shaft (or steering column) 56, which is coupled to the vehicle's handlebars 31 or is rotated by some other means (e.g. by a motor under joystick control) in order to vary the steer angle of the central front wheel 34. The shaft 50 (which may be a tubular shaft) is curved, such that it extends substantially parallel to the outer circumference of the central front wheel 34. One end of the shaft 50 is fixedly attached to the steering shaft 56, such that the shaft 50 turns to one side or the other in correspondence with the steer angle of the central front wheel 34.

A roller wheel 52 is mounted at the end of the shaft 50 distal from the steering shaft 56. The axis of rotation of the roller wheel 52 is perpendicular to the axis of rotation of the central front wheel 34. Instead of a roller wheel 52, the end of the shaft 50 may be provided with some other rolling means; or sliding means, for sliding across the subassembly; or toothed means for engaging across the subassembly (e.g. in the manner of a rack-and-pinion assembly).

Figure 6:
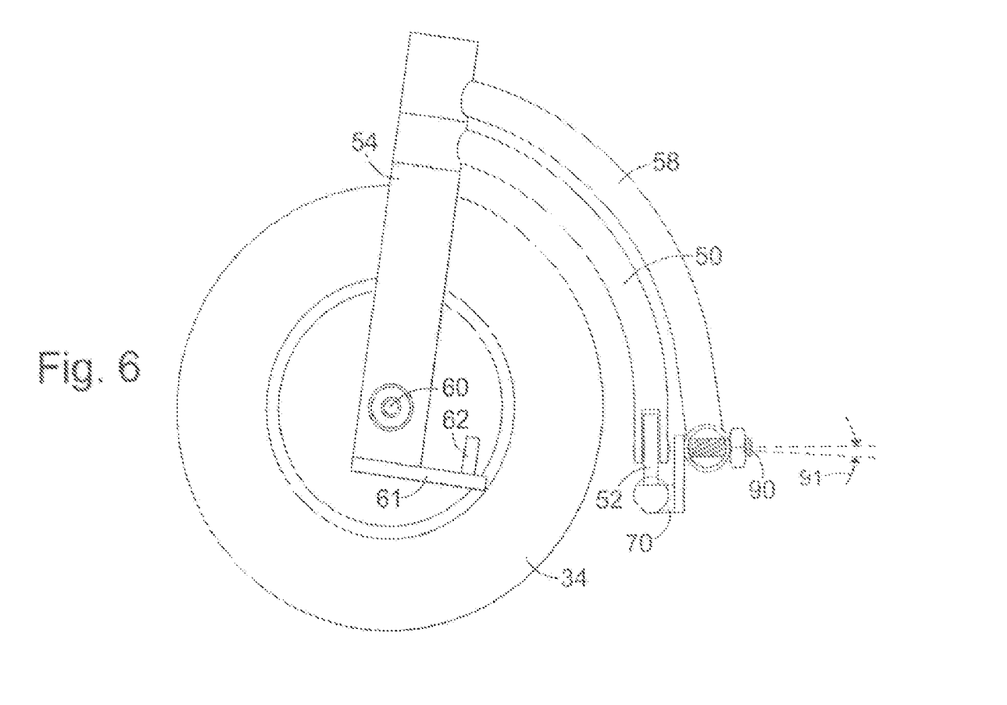
FIG. 6 illustrates the central front wheel of FIG. 5, partly attached to the vehicle.

With reference to FIG. 6, the central front wheel 34 is attached to the chassis of the vehicle by a fixed support member 58. Preferably the point of attachment of the support member 58 coincides with the pivot axis 90 of the subassembly 70, although this is not essential. The central front wheel 34, the support member 68, the shaft 50, and the roller wheel 52 are configured such that the roller wheel 52 contacts the top surface of the subassembly frame 70. When the steer angle of the central front wheel 34 is turned, the roller wheel 52 runs to the left or the right along the semicircular/U-shaped frame of the subassembly 70.

Figure 7:
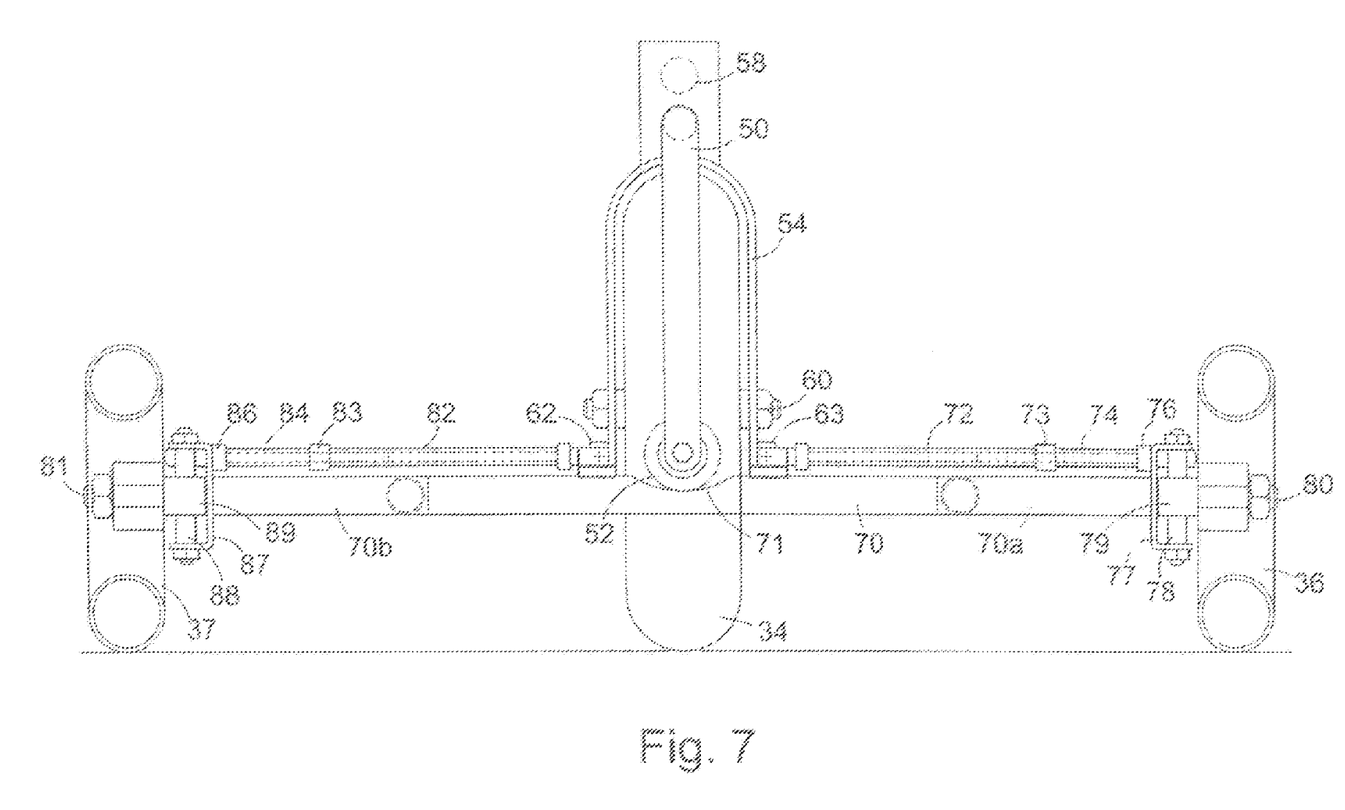
FIG. 7 illustrates a rear view of the front three wheels aligned in a straight-ahead steer angle, and a pivotally-mounted subassembly, according to an embodiment of the present invention.

With reference to FIGS. 7 and 8 and the subsequent figures, the action of the shaft 50 and the roller wheel 52 against the semicircular frame of the subassembly 70 causes the subassembly to pivot about the pivot axis 90 when the steer angle of the central front wheel 34 is turned. Additionally, since the plane of the semicircular frame is angled at 5° to the horizontal, and since the roller wheel 52 moves in a horizontal plane, the reaction of the subassembly 70 against the roller wheel 52 causes the steering to return to the central (straight-ahead) position should it be released. This gives the "null" position, which stabilises the steering and eliminates the grabbing associated with four-wheeled conventional scooters.

The subassembly frame 70 may be regarded as a cam, and the roller wheel 52 may be regarded as a cam follower. The interaction between the roller wheel 52 and the subassembly frame 70 is effectively a camming action, which causes the subassembly to pivot.

A slight depression 71 may be provided in the central region of the subassembly frame 70. The depression 71 may be substantially concave, U-shaped or V-shaped. With the central front wheel 34 pointing in the straight-ahead steer angle, the roller wheel 52 locates in the depression 71 on the subassembly frame 70. This assists in providing the "null" position, which stabilises the steering and eliminates the grabbing associated with four-wheeled conventional scooters.

The depression 71 alone may serve to provide a camming action to pivot the subassembly 70, and to bias the steering towards the straight-ahead position, without the need for the subassembly 70 and the pivot axis 90 to be angled relative to the chassis of the vehicle. Conversely, a camming action to pivot the subassembly 70, and self-centering steering, may be provided solely by the angle of the subassembly 70 and the pivot axis 90 relative to the chassis of the vehicle, without the need for the depression 71. Together, the angled subassembly 70 and the depression 71 have been found to give good behaviour of both the pivoting subassembly 70 and the self-centering steering.

As shown in FIGS. 7 and 8, the outrigger wheels 36, 37 are mounted either side of the "U"-shaped subframe 70, in regions 70a and 70b. Each outrigger wheel 36, 37 is attached via a respective axle 80, 81 to a respective hub 79, 89. Each hub 79, 89 is vertically moveable about a respective vertical pillar 78, 88 within a respective clevis structure 77, 87. The steer angle of the outrigger wheels 36, 37 can turn about kingpins 92, 93 respectively.

By virtue of the vertical pillars 78, 88 and the devises 77, 87, the outrigger wheels 36, 37 are provided with additional independent vertical movement of approximately 25-30 mm. This allows all three front wheels 34, 36, 37 to be in contact with the ground when the vehicle is travelling in a straight line. This, together with the pivoting movement of the subassembly 70, compensates for uneven ground, and allows the central front wheel 34 to remain in contact with the ground. In straight lines, this provides extremely stable travel, and enables the vehicle to traverse kerbs and other irregularities in terrain.

Figure 10:
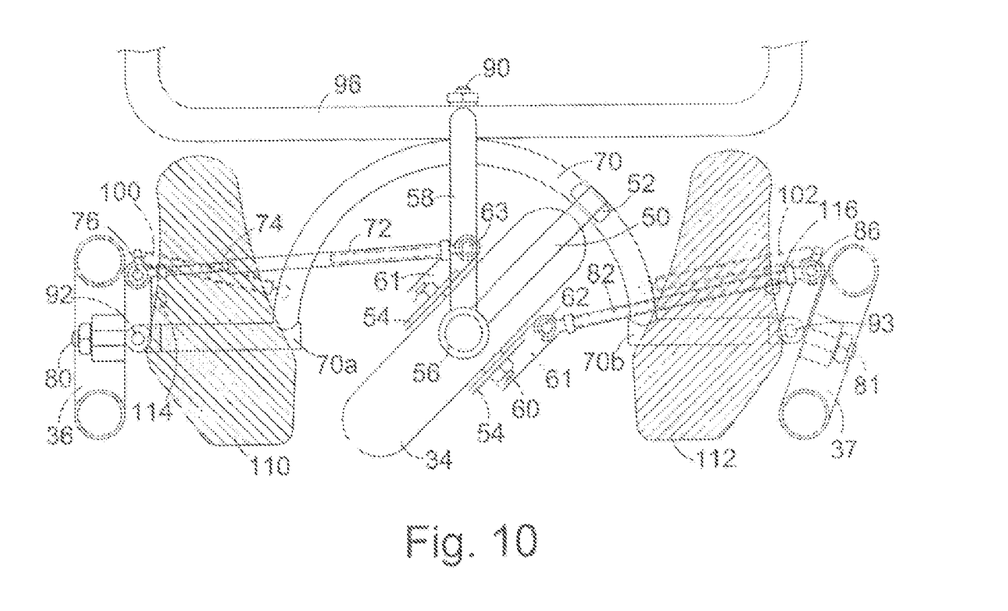
FIG. 10 illustrates a plan view from above of the front three wheels during steering, and the pivotally-mounted subassembly, incorporated in a mobility scooter.
Figure 11:
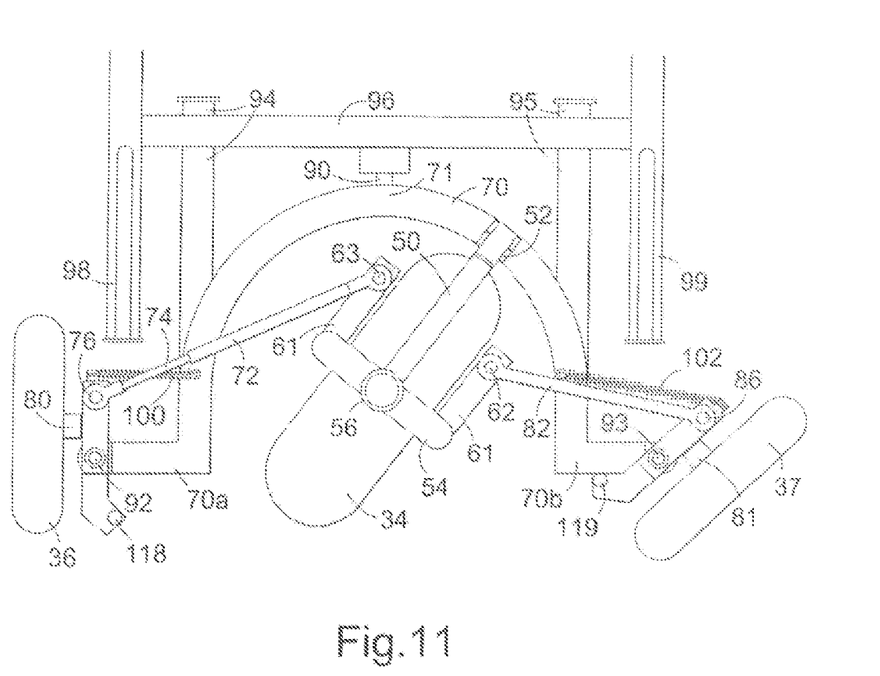
FIG. 11 illustrates an alternative plan view from above of the front three wheels during steering, and a pivotally-mounted subassembly, incorporated in a mobility scooter.

The outrigger wheels 36, 37 are restricted in movement in the lateral plane, such that forward-most part of each outrigger wheel can only pivot inwards, towards the centre of the front of the vehicle, as illustrated by wheel 37 in FIGS. 10 and 11. Stops 118 and 119 (shown in FIGS. 8 and 11) may optionally be provided to cushion the turning of the outrigger wheels inwards, against subframe regions 70a and 70b. The steer angle of the outrigger wheels is preventing from turning in the opposite sense (that is to say, the rearmost part of each outrigger wheel is prevented from turning towards the centre of the back of the vehicle) by stops 114, 116 as shown in FIG. 10. This is to prevent the outrigger wheels from entering the foot area (the user's feet 110, 112 being indicated in FIG. 10), thereby providing a larger, unobstructed, floor pan area compared with that of a conventional four-wheeled scooter.

To cause the steer angle of the outrigger wheels 36, 37 to turn, the outrigger assemblies are connected to the central front wheel assembly by expandable telescopic track rods 72,74 and 82,84. The first telescopic track rod 72,74 is connected between pivot axis 76 on the steering arm of outrigger wheel 36, and pivot axis 63 on member 61 on one side of the fork of the central front wheel 34. The second telescopic track rod 82,84 is connected between pivot axis 86 on the steering arm of outrigger wheel 37, and pivot axis 62 on member 61 on the other side of the fork of the central front wheel 34.

In each telescopic track rod, one section (e.g. 74) is of a smaller diameter than the other section (e.g. 72), the latter of which is tubular, such that section 74 can pass inside section 72. This enables the track rod 72,74 as a whole to lengthen or shorten, such that the track rod 72,74 varies in length as the steering mechanism is turned. Other extendable mechanical arrangements which may be employed instead of this telescopic track rod will be apparent to those skilled in the art, for example an arrangement in which one rod section slides alongside another section, in order to lengthen or shorten the track rod as a whole.

When compressed to its shortest length, the track rod can push against the steering arm of the outrigger wheel to which it is attached. As shown in FIGS. 10 and 11, for example, compressed track rod 82,84 can push against the steering arm of outrigger wheel 37, causing it to at least partly adopt the steer angle of the central front wheel 34.

However, as illustrated by track rod 72,74 in FIGS. 10 and 11, due to the freely expandable nature of the track rod, it cannot pull the steering arm of the outrigger wheel to which it is attached. Moreover, as previously described, stops 114, 116 prevent the outrigger wheels from turning into the floor pan area of the vehicle.

When the steering angle of the central front wheel 34 is turned, as illustrated in FIGS. 10 and 11, the roller wheel 52 runs along the U-shaped frame of the pivotally-mounted subassembly 70. Because the U-shaped frame 70 is mounted at 5 degrees to the horizontal, the effect is that the shaft 50 pushes down on one side of the subassembly 70, which causes one outrigger wheel (i.e. wheel 37 in FIGS. 10 and 11) to be pushed down, and the other outrigger wheel (i.e. wheel 36) to be lifted clear of the ground. In this example, the lifted wheel 36 is the wheel that is restricted in movement, and which is not turned towards the steer angle of the central front wheel 34. Lifting the wheel 36 off the ground in this manner eliminates any scrubbing or scraping of the tyre against the ground as the vehicle travels in a curved path.

Expressed another way, the lifted wheel 36 does not turn in the same direction as the central front wheel 34 because of the presence of the stop 114, so the expandable track rod 72, 74 lengthens to compensate.

It will be appreciated that the action of lifting one outrigger wheel (e.g. 36) and turning the other outrigger wheel (e.g. 37) is reversed when the central front wheel 34 is steered in the other direction.

Despite being extendable, the track rods 72,74 and 82,84 are maintained under a degree of compression by retaining springs 100, 102 respectively. The retaining springs 100, 102 act between the steering arm of each outrigger wheel 36, 37 and the U-shaped frame of the subassembly 70. Thus, in FIGS. 10 and 11, the outrigger wheel 37 that is turned by track rod 82,84 is restricted in this turned position by retaining spring 102. The mounting position of the retaining springs 100, 102 is such as to prevent the outrigger wheels 36, 37 from going to full lock when the vehicle is reversed.

In alternative embodiments, the retaining springs 100, 102 may be replaced by other resilient means, such as gas struts.

With reference to FIG. 3a, individual footrests 41 may be provided for the user's feet. The angle of each footrest 41 can be adjusted, e.g. downwards (into position 40) or upwards (into position 42). Adjustment of the individual footrests backwards and forwards along the vehicle is also possible.

This present mobility scooter allows the user's feet to be placed in the desired position while the outrigger wheels 36, 37 maintain stability when turning. The steering system allows the maneuverability and turning circle of a three-wheeled vehicle while maintaining the stability of a four-wheeled vehicle.

The present mobility scooter described herein allows the rider to sit approximately 50 mm lower than with conventional scooters, thereby aiding stability. The present scooter can also be approximately 100 mm shorter than conventional scooters, thereby aiding maneuverability and storage should the scooter be transported in the boot (or "trunk") of a car or other vehicle.

Posture Considerations

Figure 4A:
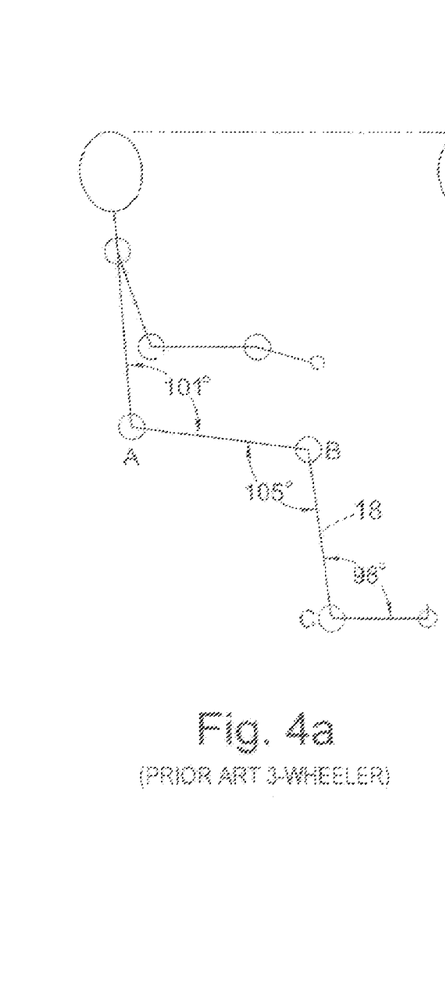
FIGS. 4a, 4b and 4c illustrate typical body postures on a conventional three-wheeled mobility scooter, a conventional four-wheeled mobility scooter, and a five-wheeled mobility scooter according to an embodiment of the present invention, respectively.
Figure 4B:
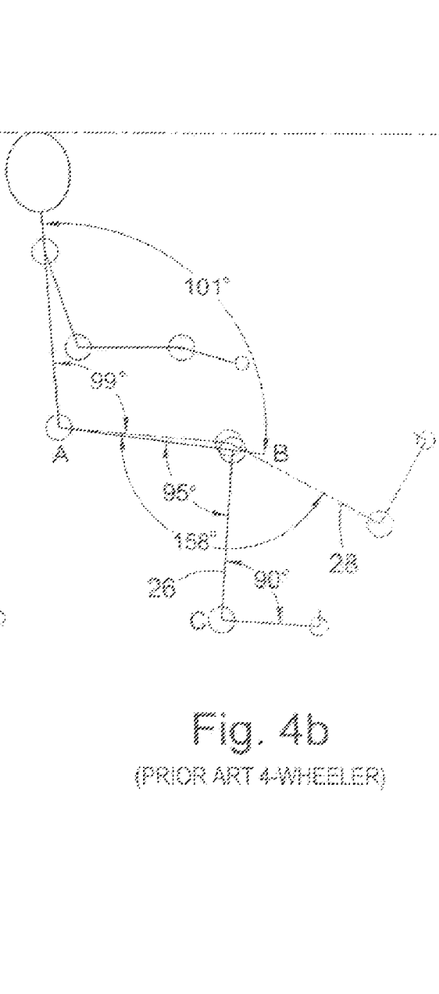
Figure 4C:
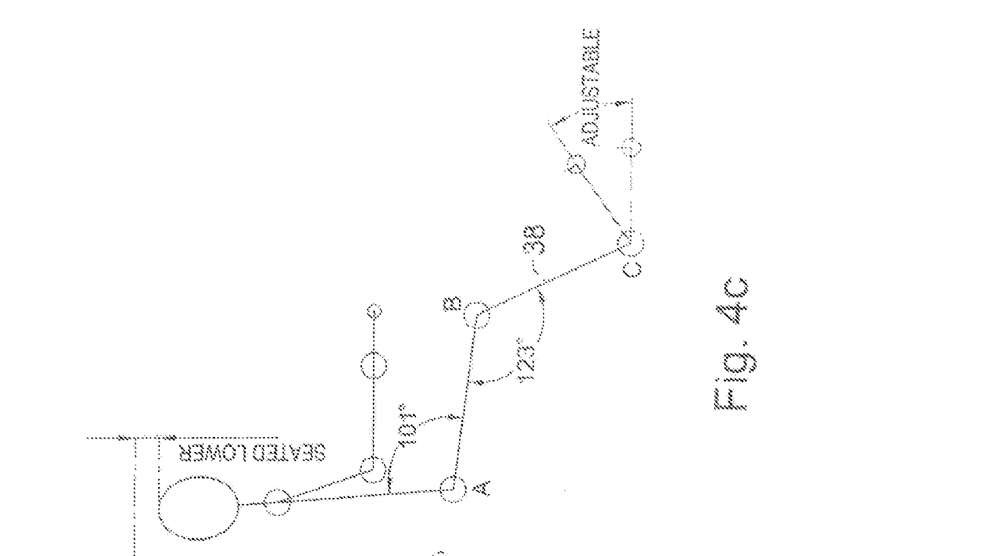

Motor vehicle manufacturers spend large budgets to research the ideal seating position and posture of the user. The general recommended posture arrangement is to have the arms slightly bent, and the back slightly raked with the hip and knee joint at as shallow an angle as possible. FIGS. 4a, 4b and 4c illustrate typical body postures on a conventional three-wheeled mobility scooter, a conventional four-wheeled mobility scooter, and a five-wheeled mobility scooter according to an embodiment of the present invention, respectively. The angles are approximate but show the positions of the joints when seated.

Ride height is important, since the lower the centre of gravity of the user (as indicated by "BCG" in FIGS. 1a, 2a and 3a), the greater the user's stability. The centre of gravity of the vehicle (as indicated by "VCG" in FIGS. 1a, 2a and 3a) should also be as low as possible, to maximise stability. To further improve the stability of the user and the vehicle, the two centres of gravity (i.e. "BCG" and "VCG") should be on the same vertical line; the further apart the two centres of gravity are, the less stable the user and the vehicle will be.

Foot positions are also important as foot placement can affect the stability of the person when reacting to different forces, e.g. going up and down hill, turning etc. The feet should always be in a forward position because the weight of the foot and leg helps to stabilise the front end of the vehicle when traversing uphill (the centre of gravity is moved forward) and helps to prevent tipping.

The same effect is when traversing downhill. With the feet in the forward position the forces trying to pull the rider forward are distributed along the leg to the hip. This takes stress off the user's leg and shoulder muscles. If the seated position is a "sit up and beg" posture as experienced with conventional four-wheeled scooters (e.g. as shown by user 26 on scooter 20 in FIG. 2a), the forces are transmitted in a 90 degree angle, placing extra stress on the knee and shoulder muscles. Considering that the likely occupant of a mobility scooter has a walking disability, this would be disadvantageous and could cause instability for the person and consequently the vehicle.

The conventional three-wheeled scooter (10 in FIG. 1a) shows a good seated position of the user 18. This seating position is also illustrated in FIG. 4a. The foot position can be varied, and can be placed anywhere on the floor pan which effects body and vehicle stability.

The conventional four-wheeled scooter (20 in FIG. 2a) shows a bad seated position of the user 26. This seating position is also illustrated in FIG. 4b. The knee joint B is too severe, as is the foot angle C. This places stress on the whole body, especially the back. The centre of gravity is moved to the rear of the vehicle which effect stability. The dotted line 28 shows the foot when positioned on the top cover above the front wheels of the scooter. This alleviates stress on joint B but loads up the back and joint A.

The five-wheeled scooter according to the preferred embodiment of the present invention, as shown in FIGS. 3a and 3b, shows a good seated position for the user 38. This seating position is also illustrated in FIG. 4c. The user's body weight is distributed along the vehicle. This gives the bodyline a linear posture, which enables the forces generated by the dynamic movement of the vehicle to be absorbed without undue stress on the user's back or muscle system. As described above, the present footrests 41 can be adjusted up and down in angle (40-42), and moved backwards and forwards, thereby allowing adjustment of the user's foot angle in two planes. This is important as the user's feet take the initial forces generated by the vehicle's movement. The footrests 41 are such that it is intuitive to the user where to place their feet in the correct area. This maintains stability in the person and the vehicle.

The invention claimed is:

1. A vehicle comprising:
   steering means for operation by a user;
   one or more rear ground-engaging wheels;

a first front ground-engaging wheel located substantially in the centre at substantially the front of the vehicle and being steerable in response to operation of the steering means;

second and third front ground-engaging wheels located either side of the first front ground-engaging wheel; and adjustment means for adjusting the steer angle and the height of the second and third front ground-engaging wheels depending on the steer angle of the first front ground-engaging wheel, the adjustment means being configured such that:

when the first front ground-engaging wheel has a straight-ahead steer angle, the steer angles of the second and third front ground-engaging wheels are also straight-ahead and the height of the second and third front ground-engaging wheel is independent of the first front ground-engaging wheel to allow the first front ground-engaging wheel to remain in contact with the ground; and when the steer angle of the first front ground-engaging wheel is turned such that motion of the vehicle would describe a curve, the steer angle of the front ground-engaging wheel on the outside of said curve is turned at least partly towards the steer angle of the first front ground-engaging wheel, the steer angle of the front ground-engaging wheel on the inside of said curve is not substantially turned towards the steer angle of the first front ground-engaging wheel, and the height of the front ground-engaging wheel on the inside of said curve is raised relative to the height of the front ground-engaging wheel on the outside of said curve, the first front ground-engaging wheel and the front ground-engaging wheel on the outside of said curve remaining in contact with the ground.

2. A vehicle as claimed in claim 1, wherein the adjustment means comprise a pivotally-mounted subassembly on which the second and third front ground-engaging wheels are mounted.

3. A vehicle as claimed in claim 2, further comprising a structural member movable by operation of the steering means and arranged to act on the subassembly and to cause the subassembly to pivot as a consequence of operation of the steering means.

4. A vehicle as claimed in claim 3, wherein a first end of the said structural member is arranged in movable contact against the subassembly, such that movement of the first end of the structural member across the subassembly, as a consequence of operation of the steering means, causes the subassembly to pivot.

5. A vehicle as claimed in claim 4, wherein the subassembly is mounted about a pivot axis, the pivot axis being inclined at an angle above the horizontal, relative to an imaginary horizontal plane defined by the lowermost points of the ground-engaging wheels.

6. A vehicle as claimed in claim 5, wherein the angle of the pivot axis above the horizontal is approximately 5°.

7. A vehicle as claimed in claim 4 wherein the subassembly incorporates a profiled region.

8. A vehicle as claimed in claim 7, wherein the profiled region is substantially concave, U-shaped or V-shaped.

9. A vehicle as claimed in claim 7 wherein the first end of the said structural member is arranged to locate within the profiled region when the steering means are configured for straight-ahead travel.

10. A vehicle as claimed in claim 4 wherein the first end of the said structural member is provided with rolling means.

11. A vehicle as claimed in claim 4 wherein the first front ground-engaging wheel is provided with a steering shaft, and the second end of the said structural member is attached to the said steering shaft.

12. A vehicle as claimed in claim 11, wherein the said structural member extends from the said steering shaft to the said subassembly, substantially parallel to the circumference of the first front ground-engaging wheel.

13. A vehicle as claimed in claim 12, wherein the subassembly incorporates a curved region shaped to correspond with the locus defined by the first end of the said structural member during variation of the steer angle of the first front ground-engaging wheel, the first end of the said structural member acting on the said curved region of the subassembly.

14. A vehicle as claimed in claim 1, wherein the adjustment means further comprise first and second connecting rods, the first and second connecting rods each having a first end and a second end, the first end of each connecting rod being arranged to move in response to operation of the steering means, the second end of the first connecting rod being coupled to a hub or steering arm of the second front ground-engaging wheel, the second end of the second connecting rod being coupled to a hub or steering arm of the third front ground-engaging wheel, and each of the first and second connecting rods being operable to push but not substantially pull its respective hub or steering arm in response to operation of the steering means.

15. A vehicle as claimed in claim 14, wherein the first and second connecting rods each incorporate a telescopic shaft, and wherein each telescopic shaft is configured to lengthen in order not to substantially pull its respective hub or steering arm.

16. A vehicle as claimed in claim 1, further comprising biasing means acting on the hub or steering arm of each of the second and third front ground-engaging wheels, the biasing means arranged to bias the steer angle of the second and third front ground-engaging wheels into a straight-ahead position.

17. A vehicle as claimed in claim 1, wherein the second and third front ground-engaging wheels are provided with stop means arranged such that, when the steer angle of the first front ground-engaging wheel is turned such that motion of the vehicle would describe a curve, the steer angle of the front ground-engaging wheel on the inside of said curve is prevented from turning past a substantially straight-ahead steer angle towards the steer angle of the first front ground-engaging wheel.

18. A vehicle as claimed in claim 1, wherein the adjustment means comprise one or more actuators.

19. A vehicle as claimed in claim 18, wherein the said one or more actuators comprise one or more of the following: electrical actuators, electromagnetic actuators, pneumatic actuators, hydraulic actuators, servo-pneumatic actuators, servo-hydraulic actuators.

20. A vehicle as claimed in claim 18 wherein the said one or more actuators are controlled by processing means.

21. A vehicle as claimed in claim 1, wherein the first front ground-engaging wheel has a larger diameter than the second and third front ground-engaging wheels.

22. A vehicle as claimed in claim 1, wherein the second and third front ground-engaging wheels are mounted such that they are vertically movable in response to uneven terrain.

23. A vehicle as claimed in claim 1, being a mobility scooter.

24. A, steering assembly for a vehicle, the steering assembly comprising:

steering means for operation by a user;

a first ground-engaging wheel being steerable in response to operation of the steering means;

second and third ground-engaging wheels located either side of the first ground-engaging wheel; and adjustment means for adjusting the steer angle and the height of the second and third ground-engaging wheels depending on the steer angle of the first ground-engaging wheel, the adjustment means being configured such that:

when the first ground-engaging wheel has a straight-ahead steer angle, the steer angles of the second and third ground-engaging wheels are also straight-ahead and all three ground-engaging wheels are in contact with the ground; and when the steer angle of the first ground-engaging wheel is turned such that motion of the vehicle would describe a curve, the steer angle of the ground-engaging wheel on the outside of said curve is turned at least partly towards the steer angle of the first ground-engaging wheel, the steer angle of the ground-engaging wheel on the inside of said curve is not substantially turned towards the steer angle of the first ground-engaging wheel, and the height of the ground-engaging wheel on the inside of said curve is raised relative to the height of the ground-engaging wheel on the outside of said curve, the first ground-engaging wheel and the ground-engaging wheel on the outside of said curve remaining in contact with the ground.

* * * * *